United States Patent [19]

Ogawa et al.

[11] Patent Number: 4,499,228

[45] Date of Patent: Feb. 12, 1985

[54] RUBBER COMPOSITIONS HAVING IMPROVED CRACK GROWTH RESISTANCE

[75] Inventors: Masaki Ogawa; Yasushi Hirata, both of Sayama; Akira Tsuchikura, Tokyo, all of Japan

[73] Assignee: Bridgestone Tire Company Limited, Tokyo, Japan

[21] Appl. No.: 507,303

[22] Filed: Jun. 23, 1983

[30] Foreign Application Priority Data

Jun. 29, 1982 [JP] Japan ................................. 57-110742

[51] Int. Cl.³ ..................... C08K 3/10; C08L 9/00; C08L 47/00
[52] U.S. Cl. ................... 524/413; 525/232; 525/236; 525/237; 524/572
[58] Field of Search .............. 525/232, 236, 237; 524/413, 572

[56] References Cited

U.S. PATENT DOCUMENTS

| | | | |
|---|---|---|---|
| 4,255,296 | 3/1981 | Ogawa et al. | 525/86 |
| 4,328,133 | 5/1982 | Ogawa et al. | 524/505 |
| 4,380,607 | 4/1983 | Ikeda et al. | 525/232 |
| 4,396,051 | 8/1983 | Ogawa et al. | 524/505 |

Primary Examiner—Herbert J. Lilling
Attorney, Agent, or Firm—Sughrue, Mion, Zinn, Macpeak, and Seas

[57] ABSTRACT

A rubber composition having an improved crack growth resistance is disclosed, which contains 1–40 wt % of granular bodies having an average particle diameter of 5–500 $\mu$m, which contain 2–40 wt % of micro short fibers having an average diameter of not more than 1 $\mu$m, an average length of 1–30 $\mu$m and an aspect ratio of not less than 8 and orientated in uniaxial or biaxial direction, and is random in the orientation axis of the micro short fiber between the granular bodies.

4 Claims, No Drawings

RUBBER COMPOSITIONS HAVING IMPROVED CRACK GROWTH RESISTANCE

This invention relates to a rubber composition having a largely improved crack growth resistance.

Rubber compositions have widely been used in various industrial parts such as tire for vehicles, conveyor belt and the like from old times owing to their peculiar viscoelastic behaviors. Particularly, they make the best use of their properties when being used in that portion which is repeatedly subjected to strain. However, when the rubber composition is used under the above condition for a long period, cracks are produced due to fatigue and finally grow to cause breaking of rubber. For instance, in tires using such a rubber composition as a typical industrial part, the case that cracks are produced due to the fatigue of the rubber composition and grow to cause tire failure holds a very high ratio of total failures. Therefore, if it is able to develop rubber composition having a considerably improved crack growth resistance, not only the failure of the industrial part is merely reduced, but also the weight thereof can be lightened by considering the properties of the rubber composition at the planning stage. In case of the tire, low fuel consumption can simultaneously be promoted together with such a weight-saving.

In such a sense, the feature of improving the crack growth resistance of the rubber composition can be said to be a fundamental and permanent subject matter in researchers and engineers studying on rubber compositions. Of course, there are made many studies in order to improve the crack growth resistance of the rubber composition. Among them, attempts for compounding micro composite body into rubber composition have been proposed, for instance, in U.S. Pat. Nos. 4,255,296 and 4,328,133 and were relatively large in the improving effect.

However, the rubber compositions using such micro composite body exhibit a very high effect for the improvement of crack growth resistance when cracks advance in a direction perpendicular to the orientation direction of the short fiber, but do not quite exhibit the improving effect when cracks advance in a direction parallel to the orientation direction.

Therefore, even when such a rubber composition is applied to a tread in off-road tires, expected effects can not sufficiently be achieved, so that it is demanded to develop techniques for satisfactorily improving the crack growth resistance at present.

On the other hand, the inventors have made studies on micro short fibers for many years and succeeded in the introduction of them into actual tire members and largely contributed to improve the performances of the tire. In fact, however, the rubber composition containing the micro short fibers developed a large effect in a part of the tire members, but exhibited a result considerably poorer than that estimated at laboratory level in certain tire members. As a result of analyzing this fact, it has been confirmed that inputs during the actual running of tire are fairly complicated as compared with inputs artificially given in the laboratory, and particularly input acting to produce cracks in the orientation direction of micro short fiber (it is usually designed that such an input is difficult to act to the orientation direction from a viewpoint of the structure) is considerably larger than that expected at the planning.

If it is intended to remove the orientation of short fiber for dealing with the above phenomenon, the crack growth based on the orientation direction can be prevented and hence the crack growth resistance can largely be improved. However, the removal of short fiber orientation is nearly impossible in the existing industrial equipments for rubber.

Under the above circumstances, the inventors have made further studies with respect to a compounding method sufficiently developing the properties inherent to the micro short fiber and found that when micro short fibers are uniformly dispersed in a rubber composition as an independent layer of micro short fibers orientated as far as possible without merely compounding the micro short fibers into the rubber composition, the orientation direction of micro short fiber in the resulting rubber composition becomes random viewing between separate independent layers when being produced by means of the existing industrial equipment for rubber, and surprisingly the demerits of the rubber composition using the conventional micro short fiber can be solved at once while maintaining merits thereof as they are.

That is, the rubber composition having an improved crack growth resistance according to the invention is characterized by containing 1 to 40% by weight of a granular body having an average particle diameter of 5 to 500 $\mu$m, which contains 2 to 40% by weight of micro short fibers having an average diameter of not more than 1 $\mu$m, an average length of 1 to 30 $\mu$m and an aspect ratio of not less than 8 and orientated in uniaxial or biaxial direction such as short fibers of alkali metal titanate single crystal, isotactic polypropylene, syndiotactic-1,2-polybutadiene or the like, and being random in the orientation axis of the micro short fiber between these granular bodies.

According to the invention, the rubber composition contains granular bodies each containing 2 to 40% by weight of uniaxially or biaxially orientated micro short fibers each having an average diameter of not more than 1 $\mu$m, an average length of 1 to 30 $\mu$m and an aspect ratio of not less than 8 as mentioned above. When the average diameter of the micro short fiber exceeds 1 $\mu$m, shearing stress applied to both ends of the micro short fiber becomes larger and cracks grow from both ends, so that the crack growth resistance is rather deteriorated by the compounding of the micro short fiber in view of the whole of the rubber composition. Further, when the average length of the micro short fiber is less than 1 $\mu$m, the addition effect as the micro short fiber can not be expected, while when the average length exceeds 30 $\mu$m, the processability lowers considerably. Moreover, when the aspect ratio (average length/average diameter) of the micro short fiber is less than 8, the addition effect as the micro short fiber can not be expected and the crack growth resistance degrades.

The reason why the amount of the micro short fiber in the granular body is limited to 2–40% by weight is based on the fact that when the amount is less than 2% by weight, the effect of the micro short fiber added can not be expected, while when the amount exceeds 40% by weight, the micro short fibers can not uniformly be dispersed in the granular body and rather the crack growth resistance is deteriorated. The granular body contains the above defined amount of the micro short fibers orientated in uniaxial or biaxial direction in rubber, but it is preferable to further contain 1 to 50% by weight of an inorganic filler, preferable carbon black.

The kind of micro short fiber is not specified, but it is most preferable to use micro short fiber of alkali metal titanate single crystal, micro short fiber of isotactic polypropylene or micro short fiber of syndiotactic-1,2-polybutadiene among the conventionally known materials.

When the average particle diameter of the granular body is less than 5 μm, it is difficult to produce these granular bodies industrially, while when the average particle diameter exceeds 500 μm, stress acting to boundary between the granular body and rubber matrix becomes excessively large and consequently cracks are produced from the boundary or grow along the boundary. Therefore, the granular body having an average particle diameter of 5 to 500 μm, is dispersed and embedded in rubber for rubber matrix. As the rubber for rubber matrix, it is preferable to use a rubber composition consisting essentially of a diene rubber, such as polyisoprene rubber, polybutadiene rubber, styrene-butadiene copolymer rubber, isoprene-butadiene copolymer rubber, acrylonitrile-butadiene copolymer rubber, ethylene-propylene-diene terpolymer rubber or the like. Preferably, this rubber composition contains 10 to 100 parts by weight of carbon black having a DBP (dibutyl phthalate absorption value) of 60–130 ml/100 g and an IA (iodine adsorption value) of 30–150 mg/g. According to the invention, the granular body is usually embedded in an amount of 1 to 40% by weight in the rubber composition for such rubber matrix. When the amount of granular body is less than 1% by weight, the effect aimed at the invention can not be expected, while when the amount exceeds 40% by weight, not only the processability considerably lowers, but also the granular bodies come into contact with each other to provide insufficient dispersion and hence the properties of the rubber composition are considerably degraded.

According to the invention, the granular bodies each composed of particular micro short fibers orientated in uniaxial or biaxial direction as described above are embedded in the rubber composition and the orientation axis of the micro short fiber is random between the granular bodies, whereby the crack growth resistance against all directions is considerably improved as compared with the fact that cracks have been produced in a direction parallel to the orientation direction of micro short fiber in the conventional rubber composition obtained by merely compounding the micro short fibers into rubber for improving the crack growth resistance. Therefore, the rubber compositions according to the invention can be used as a rubber material for tread, breaker, carcass, bead portions of tire as well as various industrial parts such as conveyor belt, rubber hose, rubber vibration isolator, shock receiving member and the like.

According to the invention, the term "granular body containing micro short fibers orientated in biaxial or plane direction" includes one obtained by finely pulverizing a rubber sheet of a rubber composition containing micro short fibers orientated in the biaxial direction as well as one obtained by piling very thin films of a rubber composition containing micro short fibers orientated in the uniaxial direction one upon another and finely pulverizing the resulting piled rubber sheet of biaxial orientation.

The invention will now be described below with reference to the following examples and comparative examples.

EXAMPLES 1–3, COMPARATIVE EXAMPLES 1–9

Examples 1–3 show that the rubber compositions according to the invention greatly improve the crack growth resistance as compared with the conventional rubber composition containing micro short fibers as a reinforcement.

The rubber composition to be used in Example 1 was prepared as follows: that is, the following ingredients were kneaded in a Banbury mixer and shaped into a sheet of 1 mm thick by means of rolls of 10 inch (25.4 cm) diameter, which was then subjected to a press curing (145° C. × 30 minutes) to obtain a rubber sheet reinforced with uniaxially orientated micro short fibers.

| Ingredient | part by weight |
| --- | --- |
| IR 2200 | 100 |
| Carbon black HAF | 30 |
| Micro short fiber of potassium titanate single crystal | 15 |
| Antioxidant*[1] | 1.0 |
| Stearic acid | 2.0 |
| Zinc white (ZnO) | 3.0 |
| Vulcanization accelerator*[2] | 0.5 |
| Sulfur | 1.5 |

*[1] N—phenyl-N'—isopropyl-p-phenylenediamine, Nocrac 810NA (trade name), made by Ohuchi Shinko Kagaku K.K.
*[2] N—oxydiethylene-2-benzothiazole sulfenamide, Nobs (trade name), made by Ohuchi Shinko Kagaku K.K.

The micro short fiber of potassium titanate single crystal was produced by the method described in Japanese Patent laid open No. 51-122,700 and had an average diameter of 0.21 μm and an average length of 14.5 μm (made by Ohtsuka Kagaku Yakuhin K.K.). The content of micro short fibers in the rubber sheet was 9.8%. This rubber sheet was swollen by immersing in n-hexane for 48 hours, which was pulverized in a high-speed mixer at a rotating speed of 6,000 rpm to form a slurry of particles having an average particle diameter of 0.55 mm. Moreover, the average particle diameter in this slurry was measured by using a microtrac particle size distribution analyzer made by Leeds & Northrup Corporation.

The above slurry was further treated in a pulverizer, TK-micolloider S-type CM 40023 made by Tokushu Kika Kogyo K.K. to obtain a slurry of particles having a smaller average particle diameter (average particle diameter: 0.15 mm). In this case, the average particle diameter was measured by using the same microtrac particle size distribution analyzer.

The later slurry was mixed with a 10% solution of IR 2200 made by Japan Synthetic Rubber K.K. in toluene and then dried to obtain granular bodies. In this case, the amount of granular body was adjusted to be 20% by weight on a dry weight.

To 125 parts by weight of this master batch were added 45 parts by weight of carbon black HAF, 5 parts by weight of aromatic oil, 2 parts by weight of stearic acid and 1 part by weight of an antioxidant (810NA), which was subjected to a first kneading in a Banbury mixer. To this kneaded mass were further added 3 parts by weight of zinc white, 0.5 part by weight of a vulcanization accelerator (Nobs) and 2.0 parts by weight of sulfur, which was subjected to a second kneading in the same Banbury mixer to obtain a rubber composition.

The rubber composition to be used in Example 2 was prepared as follows: that is, the following ingredients were kneaded in a Banbury mixer and shaped into a sheet of 1 mm thick by means of rolls of 10 inch (25.4 cm) diameter, which was then subjected to a press curing (145° C.×30 minutes) to obtain a rubber sheet reinforced with uniaxially orientated micro short fibers.

| Ingredient | part by weight |
| --- | --- |
| VCBR*[1] | 100 |
| HAF | 30 |
| 810NA | 1 |
| Stearic acid | 2 |
| Zinc white | 3 |
| Vulcanization accelerator*[2] | 0.2 |
| Nobs | 0.8 |
| Sulfur | 0.7 |

*[1] made by Ube Kosan K.K., cis-1,2-polybutadiene rubber reinforced with syn-1,2-polybutadiene micro short fibers, content of micro short fiber: 11%, average diameter of micro short fiber: 0.25 μm, average length of micro short fiber: 2.7 μm.
*[2] dibenzothiazyldisulfide, Noccelar DM (trade name), made by Ohuchi Shinko Kagaku K.K.

The rubber sheet was swollen by immersing in n-hexane for 48 hours and then pulverized in a high-speed mixer at a rotating speed of 6,000 rpm to form a slurry of particles having an average particle diameter of 0.45 mm. This average particle diameter was measured in the same manner as described in Example 1.

This slurry was further treated in the same micolloider S-type CM 40023 as used in Example 1 to form a slurry of particles having an average particle diameter of 0.12 mm. The later slurry was mixed with a 10% solution of BR 01 made by Japan Synthetic Rubber K.K. in toluene and then dried to obtain a master batch. In this case, an amount of granular bodies in the batch was adjusted to be 20% by weight on a dry weight.

To 125 parts by weight of the master batch were added 45 parts by weight of carbon black HAF, 5 parts by weight of aromatic oil, 2 parts by weight of stearic acid and 1 part by weight of an antioxidant (810NA), which was subjected to a first kneading in a Banbury mixer. To this kneaded mass were further added 3 parts by weight of zinc white, 0.2 part by weight of a vulcanization accelerator (DM), 0.8% by weight of Nobs and 1.5 parts by weight of sulfur, which was subjected to a second kneading to obtain a rubber composition.

The rubber composition to be used in Example 3 was prepared as follows: that is, polymeric powder of isotactic (hereinafter referred to as iso)-polypropylene was swollen by immersing in n-hexane at 60° C. and pulverized in the same high-speed mixer as used in Example 1 to form a slurry. This slurry was mixed with a solution of cis-1,4-polyisoprene rubber (IR 2200) in toluene with stirring. In this case, the weight ratio of IR 2200 to iso-polypropylene was adjusted to be 5:1 on a dry weight. After the drying, the mixture was extruded by means of an extruder having a length/diameter ratio (L/D)=4/2 at an orifice temperature of 210° C. to form micro short fibers of iso-polypropylene. The resulting micro short fiber had an average diameter of 0.3 μm and an average length of 2.9 μm. Then, the following ingredients including the above micro short fiber were kneaded in a Banbury mixer.

| Ingredient | part by weight |
| --- | --- |
| IR 2200 | 100 |
| Micro short fiber of iso-polypropylene | 20 |
| HAF | 30 |
| 810NA | 1 |

| Ingredient | part by weight |
| --- | --- |
| Stearic acid | 2 |
| Zinc white | 3 |
| Nobs | 0.5 |
| Sulfur | 1.7 |

The above kneaded mass was passed between rolls of 10 inch (25.4 cm) diameter at a roll gap of approximately zero to form a sheet containing micro short fibers orientated in biaxial direction. The resulting five sheets were piled one upon the other at a total thickness of 1.2 mm, which was subjected to a press curing (145° C.×30 minutes) to obtain a rubber sheet of 1 mm thick.

This rubber sheet was swollen by immersing in n-hexane for 48 hours and pulverized in a high-speed mixer at a rotating speed of 6,000 rpm to form a slurry of particles having an average particle diameter of 0.63 mm. In this case, the average particle diameter was measured in the same manner as described in Example 1. Then, the slurry was further treated in the same micolloider as used in Example 1 to form a slurry of particles having an average particle diameter of 0.18 mm, which was added and mixed with a 10% solution of IR 2200 made by Japan Synthetic Rubber K.K. in toluene and then dried to obtain a master batch. In this case, an amount of granular bodies in the batch was adjusted to be 20% by weight on a dry weight.

To 125 parts by weight of the master batch were added 40 parts by weight of carbon black HAF, 5 parts by weight of aromatic oil, 2 parts by weight of stearic acid and 1 part by weight of an antioxidant (810NA), which was subjected to a first kneading in a Banbury mixer. To this kneaded mass were further added 3 parts by weight of zinc white, 0.5 part by weight of a vulcanization accelerator (Nobs) and 2 parts by weight of sulfur, which was subjected to a second kneading to obtain a rubber composition.

Next, rubber compositions to be used in Comparative Examples 1-3 were prepared by merely dispersing micro short fibers in a rubber composition having the same average compounding recipe as in Examples 1-3 without forming the granular body, respectively.

Furthermore, rubber compositions to be used in Comparative Examples 4-6 were prepared by using the same compounding recipe as in Comparative Examples 1-3 without using micro short fibers, respectively.

Finally, rubber compositions to be used in Comparative Examples 7-9 were prepared by dispersing micro short fibers in a rubber composition having the same compounding recipe as in Examples 1-3 at a concentration corresponding to the concentration of micro short fiber in the granular body used in Examples 1-3 without forming the granular body, respectively. In Comparative Example 8, however, VCBR containing 12.5% of micro short fiber was used.

The crack growth resistance was measured with respect to the rubber compositions in Examples 1-3 and Comparative Examples 1-9 to obtain a result as shown in the following Table 1 together with the micro short fiber, granular body and average compounding recipe of the rubber composition.

Moreover, the crack growth resistance was evaluated as follows. That is, a sheet-like sample of 5 cm wide and 2 mm thick was made by using each of the above rubber composition, and a crack of 2 mm wide was formed in a center of the sample. Then, a 70% strain was applied to the sample at a frequency of 300 cycle/min, during which a time required till the breaking of the sample was measured. The crack growth resistance was represented by an index according to the following equation on a basis that the measured time in Comparative Examples 4, 5 and 6 is 100.

In the conventional micro short fiber reinforced rubber composition, there is a conspicuous anisotropy in the crack growth resistance according to the orientation direction of the micro short fiber as previously mentioned. In order to confirm this phenomenon, the test for the crack growth resistance was made under such a condition that after a sample was punched out from a rubber sheet in a direction parallel to rolling direction, an initial cut was formed in the sample in a direction perpendicular or parallel to the rolling direction.

$$\text{Crack growth resistance} = \frac{\text{Time required till the breaking of test sample}}{\text{Time required till the breaking of sample used in Comparative Example 4, 5 or 6}}$$

TABLE 1 (a)

|  |  | Example 1 | Comparative Example 1 | Comparative Example 4 | Example 2 | Comparative Example 2 | Comparative Example 5 |
|---|---|---|---|---|---|---|---|
| Average diameter (d) of micro short fiber (μm) | | 0.21 | 0.21 | — | 0.25 | 0.25 | — |
| Average length (l) of micro short fiber (μm) | | 14.5 | 14.5 | — | 2.7 | 2.7 | — |
| Aspect ratio of micro short fiber (l/d) | | 69.0 | 69.0 | — | 10.8 | 10.8 | — |
| Amount of micro short fiber in granular body (% by weight) | | 9.8 | — | — | 8.0 | — | — |
| Amount of micro short fiber in rubber composition (% by weight) | | 1.33 | 1.33 | — | 1.09 | 1.09 | — |
| Orientation | | uniaxial | — | — | uniaxial | — | — |
| Material of micro short fiber | | potassium titanate | potassium titanate | — | syn-1,2-polybutadiene | syn-1,2-polybutadiene | — |
| Average particle diameter of granular body (μm) | | 74 | — | — | 68 | — | — |
| Amount of granular body in rubber composition (% by weight) | | 13.6 | — | — | 13.6 | — | — |
| Average compounding recipe | IR 2200 | 100 | 100 | 100 | — | — | — |
| | BR01 | — | — | — | 86.1 | 86.1 | 100 |
| | VCBR | — | — | — | 15.6 | 15.6 | — |
| | micro short fiber | 2.10 | 2.10 | 0 | (1.72) | (1.72) | 0 |
| | carbon black HAF | 42.9 | 42.9 | 42.9 | 43.4 | 43.4 | 43.4 |
| | aromatic oil | 4.3 | 4.3 | 4.3 | 4.3 | 4.3 | 4.3 |
| | stearic acid | 2.0 | 2.0 | 2.0 | 2.0 | 2.0 | 2.0 |
| | 810 NA | 1.0 | 1.0 | 1.0 | 1.0 | 1.0 | 1.0 |
| | ZnO | 3.0 | 3.0 | 3.0 | 3.0 | 3.0 | 3.0 |
| | DM | — | — | — | 0.2 | 0.2 | 0.2 |
| | Nobs | 0.5 | 0.5 | 0.5 | 0.8 | 0.8 | 0.8 |
| | sulfur | 2.0 | 2.0 | 2.0 | 1.4 | 1.4 | 1.4 |
| Crack growth resistance (initial cut perpendicular to rolling direction) | | 3015 | 108 | 100 | 3346 | 105 | 100 |
| Crack growth resistance (initial cut parallel to rolling direction) | | 3082 | 100 | 100 | 3258 | 98 | 100 |

TABLE 1 (b)

|  |  | Example 3 | Comparative Example 3 | Comparative Example 6 | Comparative Example 7 | Comparative Example 8 | Comparative Example 9 |
|---|---|---|---|---|---|---|---|
| Average diameter (d) of micro short fiber (μm) | | 0.3 | 0.3 | — | 0.21 | 0.25 | 0.3 |
| Average length (l) of micro short fiber (μm) | | 2.9 | 2.9 | — | 15.2 | 2.7 | 2.9 |
| Aspect ratio of micro short fiber (l/d) | | 9.7 | 9.7 | — | 69.0 | 10.8 | 9.7 |
| Amount of micro short fiber in granular body (% by weight) | | 12.6 | — | — | — | — | — |
| Amount of micro short fiber in rubber composition (% by weight) | | 1.76 | 1.76 | — | 9.8 | 8.0 | 12.6 |
| Orientation | | biaxial | — | — | — | — | — |
| Material of micro short fiber | | iso-polypropylene | iso-polypropylene | — | potassium titanate | syn-1,2-polybutadiene | iso-polypropylene |
| Average particle diameter of granular body (μm) | | 92 | — | — | — | — | — |
| Amount of granular body in rubber composition (% by weight) | | 14.0 | — | — | — | — | — |
| Average compounding recipe | IR 2200 | 100 | 100 | 100 | 100 | — | 100 |
| | BR01 | — | — | — | — | — | — |
| | VCBR | — | — | — | — | 100 | — |

TABLE 1 (b)-continued

|  | Example 3 | Comparative Example 3 | Comparative Example 6 | Comparative Example 7 | Comparative Example 8 | Comparative Example 9 |
|---|---|---|---|---|---|---|
| micro short fiber | 2.73 | 2.73 | 0 | 17.0 | (12.5) | 21.8 |
| carbon black HAF | 38.6 | 38.6 | 38.6 | 42.9 | 42.5 | 38.6 |
| aromatic oil | 4.3 | 4.3 | 4.3 | 4.3 | 4.23 | 4.32 |
| stearic acid | 2.0 | 2.0 | 2.0 | 2.0 | 2.0 | 2.0 |
| 810 NA | 1.0 | 1.0 | 1.0 | 1.0 | 1.0 | 1.0 |
| ZnO | 3.0 | 3.0 | 3.0 | 3.0 | 3.0 | 3.0 |
| DM | — | — | — | — | 0.2 | — |
| Nobs | 0.5 | 0.5 | 0.5 | 0.5 | 0.8 | 0.5 |
| sulfur | 2.0 | 2.0 | 2.0 | 2.0 | 1.4 | 2.0 |
| Crack growth resistance (initial cut perpendicular to rolling direction) | 3218 | 104 | 100 | 2851 | 1563 | 1254 |
| Crack growth resistance (initial cut parallel to rolling direction) | 3267 | 99 | 100 | 83 | 105 | 113 |

From the data of Table 1, it can be seen that the rubber compositions according to the invention are considerably excellent in the crack growth resistance as compared with the conventional micro short fiber reinforced rubber composition or the conventional carbon black reinforced rubber composition.

EXAMPLES 4–6, COMPARATIVE EXAMPLES 10–15

Examples 4–6 show that the average diameter, average length and aspect ratio of the micro short fiber according to the invention are limited to not more than 1 μm, range of 1–30 μm and not less than 8, respectively.

Micro short fibers having different average diameter and average length were manufactured as follows.

A polymeric powder of iso-polypropylene was swollen by immersing in n-hexane at 60° C. and pulverized in a high-speed mixer in the same manner as described in Example 1 to form a slurry. This slurry was mixed with a solution of cis-1,4-polyisoprene rubber in toluene with stirring. In this case, the amount of iso-polypropylene was adjusted to be 10% by weight on a dry weight. After the drying, the resulting mixture was extruded by means of an extruder at an orifice temperature of 210° C. to form a micro short fiber of iso-polypropylene. In this way, nine kinds of micro short fibers as shown in the following Table 2 were obtained.

The shape of the micro short fiber was controlled by properly selecting the particle size of iso-polypropylene in the slurry, L/D in the orifice of the extruder, the extrusion rate and the feeding temperature.

The master batch of the above micro short fiber was kneaded with other ingredients according to the following compounding recipe and shaped by means of rolls 10 inch (25.4 cm) diameter into a sheet of 2 mm thick, which was subjected to a press curing at 145° C. for 30 minutes.

| Ingredient | part by weight |
|---|---|
| Master batch | 110 |
| Carbon black ISAF | 20 |
| 810NA | 1 |
| Stearic acid | 2 |
| Zinc white | 3 |
| Nobs | 0.5 |
| Sulfur | 1.7 |

The resulting rubber sheet was swollen by immersing in n-hexane for 48 hours and pulverized in a high-speed mixer at a rotating speed of 6,000 rpm to form a slurry of particles having an average particle diameter of 0.65 mm. In this case, the average particle diameter was measured in the same manner as described in Example 1. Then, the slurry was further treated in the same microlloider as in Example 1 to form a slurry of particles having an average particle diameter of 0.20 mm, which was mixed with a 10% solution of IR 2200 made by Japan Synthetic Rubber K.K. in toluene with stirring and then dried to obtain a master batch. In this case, an amount of granular bodies in the batch was adjusted to be 30% by weight on a dry weight.

To 143 parts by weight of the master batch were added 50 parts by weight of carbon black HAF, 5 parts by weight of aromatic oil, 2.5 parts by weight of stearic acid, 2 parts by weight of an antioxidant (810NA), 4 parts by weight of zinc white, 0.7 part by weight of a vulcanization accelerator (Nobs) and 2 parts by weight of sulfur, which was kneaded at two stage in a Banbury mixer in the same manner as described in Example 1 to obtain a rubber composition corresponding to each of Examples 4–6 and Comparative Examples 10–15 as shown in Table 2.

The crack growth resistance (initial cut perpendicular to rolling direction) was measured with respect to the resulting rubber compositions in the same manner as described in Example 1, and also the processability in the production of the granular body-containing rubber sheet was evaluated by the presence of burr on a roll of 10 inch (25.4 cm) diameter. The results thus measured are also shown in Table 2.

TABLE 2 (a)

|  | Comparative Example 10 | Comparative Example 11 | Example 4 | Example 5 | Example 6 |
|---|---|---|---|---|---|
| Average diameter of micro short fiber (μm) | 0.08 | 0.5 | 0.2 | 0.4 | 0.8 |
| Average length of micro short fiber (μm) | 0.8 | 1.8 | 1.8 | 18.2 | 29.5 |
| Aspect ratio of micro short fiber | 10 | 3.6 | 9.0 | 45.5 | 36.9 |

TABLE 2 (a)-continued

|  | Comparative Example 10 | Comparative Example 11 | Example 4 | Example 5 | Example 6 |
|---|---|---|---|---|---|
| Amount of micro short fiber in granular body (%) | 8.0 | 8.0 | 8.0 | 8.0 | 8.0 |
| Amount of granular body (%) | 20.5 | 20.5 | 20.5 | 20.5 | 20.5 |
| Average particle diameter of granular body (μm) | 76 | 75 | 76 | 68 | 71 |
| Orientation | uniaxial | uniaxial | uniaxial | uniaxial | uniaxial |
| Processability (presence of burr) | absence | absence | absence | absence | absence |
| Crack growth resistance (initial cut perpendicular to rolling direction) | 987 | 354 | 2986 | 3428 | 2851 |
| Note | strength of micro short fiber is too small | — | — | — | — |

TABLE 2 (b)

|  | Comparative Example 12 | Comparative Example 13 | Comparative Example 14 | Comparative Example 15 |
|---|---|---|---|---|
| Average diameter of micro short fiber (μm) | 1.2 | 0.7 | 1.2 | 1.2 |
| Average length of micro short fiber (μm) | 26.5 | 31.5 | 38.5 | 8.4 |
| Aspect ratio of micro short fiber | 22.1 | 45 | 32.1 | 7.0 |
| Amount of micro short fiber in granular body (%) | 8.0 | 8.0 | 8.0 | 8.0 |
| Amount of granular body (%) | 20.5 | 20.5 | 20.5 | 20.5 |
| Average particle diameter of granular body (μm) | 75 | 77 | 78 | 68 |
| Orientation | uniaxial | uniaxial | uniaxial | uniaxial |
| Processability (presence of burr) | slightly presence | presence | presence | absence |
| Crack growth resistance (initial cut perpendicular to rolling direction) | 348 | 88 | 51 | 518 |
| Note | Creep is large | Processability is poor and dispersion is ununiform | Processability is poor and dispersion is ununiform | Creep is large |

EXAMPLES 7-9, COMPARATIVE EXAMPLES 16-18

Examples 7-9 show that the amount of micro short fiber in the granular body is restricted to 2-40% by weight.

Rubber compositions for granular body were prepared by using the same micro short fiber of potassium titanate single crystal as used in Example 1 according to the compounding recipe as shown in the following Table 3 in the same manner as described in Example 1.

The rubber composition for granular body was shaped by means of rolls of 10 inch (25.4 mm) diameter into a sheet of 2 mm thick and cured at 145° C. for 30 minutes, which was then pulverized in the same manner as described in Example 1 to obtain a natural rubber based master batch having 25% by weight on a dry weight of granular bodies.

To 134 parts by weight of the master batch were added 40 parts by weight of carbon black HAF, 5 parts by weight of aromatic oil, 2 parts by weight of stearic acid, 1 part by weight of an antioxidant (810NA), 3.0 parts by weight of zinc white, 0.6 part by weight of a

TABLE 3

|  | Comparative Example 16 | Example 7 | Example 8 | Example 9 | Comparative Example 17 | Comparative Example 18 |
|---|---|---|---|---|---|---|
| Natural rubber | 100 | 100 | 100 | 100 | 100 | 100 |
| ISAF | 20 | 20 | 20 | — | — | — |
| Micro short fiber of potassium titanate single crystal | 2 | 3 | 20 | 70 | 80 | 100 |
| 810 NA | 1 | 1 | 1 | 1 | 1 | 1 |
| Stearic acid | 2 | 2 | 2 | 2 | 2 | 2 |
| ZnO | 3 | 3 | 3 | 3 | 3 | 3 |
| Nobs | 0.6 | 0.6 | 0.6 | 0.6 | 0.6 | 0.6 |
| Sulfur | 1.7 | 1.7 | 1.7 | 1.7 | 1.7 | 1.7 |
| Amount of micro short fiber (%) | 1.5 | 2.3 | 13.5 | 39.3 | 42.5 | 48 |
| Processability | no problem | no problem | no problem | no problem | slightly buggy | buggy |
| Dispersion state | no problem | no problem | no problem | no problem | poor dispersion | poor dispersion | vulcanization accelerator (Nobs) and 2.0 parts by weight of sulfur, which was kneaded at two stage in a Banbury mixer in the same manner as described in Example 1 to obtain a rubber composition corresponding to each of Examples 7-9 and Comparative Examples 16-18 as shown in the following Table 4.

The crack growth resistance (initial cut perpendicular to rolling direction) was measured with respect to the resulting rubber compositions to obtain a result as shown in Table 4.

according to a test method of JIS K-6301. The results thus measured are shown in the Table 5.

The strength at breaking was measured on a sample having a shape of JIS No. 3.

$$\text{Index} = \frac{\text{Strength at breaking of sample}}{\text{Strength at breaking of control}} \times 100$$

TABLE 5

|  | Comparative Example 19 | Comparative Example 20 | Example 10 | Example 11 | Example 12 | Comparative Example 21 |
|---|---|---|---|---|---|---|
| Amount of micro short fiber in granular body (%) | — | 135 | 135 | 135 | 135 | 135 |
| Amount of granular body (%) | — | 18.0 | 18.0 | 18.0 | 18.0 | 18.0 |
| Average particle diameter of granular body (μm) | — | 4.0 | 6.2 | 35.6 | 484 | 565 |
| Orientation | — | uniaxial | uniaxial | uniaxial | uniaxial | uniaxial |
| Strength at breaking (index) | 100 | 115 | 103 | 102 | 99 | 75 |
| Crack growth resistance (initial cut perpendicular to rolling direction) | 104 | 3842 | 4653 | 4056 | 2540 | 89 |
| Note | — | yield is poor in pulverization with micolloider (difficult industrialization) | no problem | no peoblem | no problem | no problem |

TABLE 4

|  | Comparative Example 16 | Example 7 | Example 8 | Example 9 | Comparative Example 17 | Comparative Example 18 |
|---|---|---|---|---|---|---|
| Amount of micro short fiber in granular body (%) | 1.5 | 2.3 | 13.5 | 39.3 | 42.5 | 48 |
| Amount of granular body (%) | 18 | 18 | 18 | 18 | 18 | 18 |
| Average particle diameter of granular body (μm) | 65.4 | 63.2 | 70.5 | 61.6 | 82.5 | 89.9 |
| Orientation | uniaxial | uniaxial | uniaxial | uniaxial | uniaxial | uniaxial |
| Crack growth resistance (initial cut perpendicular to rolling direction) | 754 | 30124 | 4563 | 2894 | 285 | 71 |

EXAMPLES 10-12, COMPARATIVE EXAMPLES 19-21

Examples 10-12 show that the average particle diameter is restricted to 5-500 μm.

The cured rubber sheet of 2 mm thick for the granular body of Example 8 was swollen by immersing in n-hexane for 48 hours and pulverized in a high-speed mixer at a rotating speed of 6,000 rpm to form a slurry of particles having an average particle diameter of 0.85 mm. This slurry was further treated in a micolloider to form a slurry of particles having a smaller average particle diameter. The same procedure as described in Example 8 was repeated by using the later slurry to obtain a rubber composition containing the granular body of a different average particle diameter, which corresponds to each of Examples 10-12 and Comparative Examples 20 and 21 as shown in the following Table 5. Moreover, a rubber composition for Comparative Example 19 was prepared as a control by removing the granular body from the compounding recipe of Example 8. The crack growth resistance (initial cut perpendicular to rolling direction) was measured with respect to these rubber compositions, and also the strength at breaking was evaluated by an index based on the following equation

EXAMPLES 13-15, COMPARATIVE EXAMPLES 22-23

Examples 13-15 show that the amount of granular body in rubber composition is restricted to 1-40% by weight.

The cured rubber sheet for granular body (thickness: 2 mm) in Example 8 was swollen by immersing in n-hexane for 48 hours and pulverized in a high-speed mixer at a rotating speed of 6,000 rpm to form a slurry of particles having an average particle diameter of 0.51 μm. This slurry was further pulverized in an S-type microlloider and mixed with a 10% solution of a blend of natural rubber and butadiene rubber having a blend ratio of 9:1 in toluene, provided that the amount of granular body on a dry weight was adjusted to a value as shown in the following Table 6.

TABLE 6

|  | Comparative Example 22 | Example 13 | Example 14 | Example 15 | Comparative Example 23 |
|---|---|---|---|---|---|
| Amount of granular body in master batch (%) | 1.2 | 5 | 15 | 50 | 55 |

TABLE 6-continued

|  | Comparative Example 22 | Example 13 | Example 14 | Example 15 | Comparative Example 23 |
|---|---|---|---|---|---|
| Symbol of master batch | A | B | C | D | E |

To each of the above master batches were added ingredients as shown in the following Table 7, which was then kneaded at two stage to obtain a rubber composition corresponding to each of Examples 13–15 and Comparative Examples 22–23.

TABLE 7

|  | Comparative Example 22 | Example 13 | Example 14 | Example 15 | Comparative Example 23 |
|---|---|---|---|---|---|
| Master batch A | 101 | | | | |
| Master batch B | | 105 | | | |
| Master batch C | | | 118 | | |
| Master batch D | | | | 200 | |
| Master batch E | | | | | 285 |
| ISAF | 45 | 45 | 45 | 45 | 45 |
| Aromatic oil | 7 | 7 | 7 | 7 | 7 |
| 810NA | 1 | 1 | 1 | 1 | 1 |
| Stearic acid | 2.5 | 2.5 | 2.5 | 2.5 | 2.5 |
| ZnO | 5 | 5 | 5 | 5 | 5 |
| DM | 0.2 | 0.2 | 0.2 | 0.2 | 0.2 |
| Nobs | 0.5 | 0.5 | 0.5 | 0.5 | 0.5 |
| Sulfur | 2.0 | 2.0 | 2.0 | 2.0 | 2.0 |
| Amount of granular body (%) | 0.6 | 3.0 | 9.9 | 38.0 | 42.8 |

The crack growth resistance and processability were measured with respect to these rubber compositions in the same manner as previously mentioned to obtain results as shown in the following Table 8 together with the amount of micro short fiber in granular body, amount and average particle diameter of granular body and orientation.

TABLE 8

|  | Comparative Example 22 | Example 13 | Example 14 | Example 15 | Comparative Example 23 |
|---|---|---|---|---|---|
| Amount of micro short fiber in granular body (%) | 13.5 | 13.5 | 13.5 | 13.5 | 13.5 |
| Amount of granular body (%) | 0.6 | 3.0 | 9.9 | 38.0 | 42.8 |
| Average particle size of granular body (μm) | 70.5 | 70.5 | 70.5 | 70.5 | 70.5 |
| Orientation | uniaxial | uniaxial | uniaxial | uniaxial | uniaxial |
| Crack growth resistance | 108 | 2850 | 4635 | 2048 | 76 |
| Processability in Banbury mixer | no problem | no problem | no problem | no problem | insufficient dispersion |
| Processability between roots | no problem | no problem | no problem | slightly buggy | buggy |

What is claimed is:

1. A rubber composition having an improved crack growth resistance, characterized by containing 1 to 40% by weight of a granular body having an average particle diameter of 5 to 500 μm, which contains 2 to 40% by weight of micro short fibers having an average diameter of not more than 1 μm, an average length of 1 to 30 μm and an aspect ratio of not less than 8 and orientated in uniaxial or biaxial direction, and being random in the orientation axis of the micro short fiber between these granular bodies.

2. A rubber composition according to claim 1, wherein said micro short fiber is selected from micro short fiber of alkali metal titanate single crystal, micro short fiber of isotactic-polypropylene and micro short fiber of syndiotactic-1,2-polybutadiene.

3. A rubber composition according to claim 1, wherein said rubber composition comprises a diene rubber.

4. A rubber composition according to claim 3, wherein said diene rubber is selected from polyisoprene rubber, polybutadiene rubber, styrene-butadiene copolymer rubber, isoprene-butadiene copolymer rubber, acrylonitrile-butadiene copolymer rubber and ethylene-propylene-diene terpolymer rubber.

* * * * *